(12) United States Patent
Rudak et al.

(10) Patent No.: US 7,027,666 B2
(45) Date of Patent: Apr. 11, 2006

(54) METHOD FOR DETERMINING SKEW ANGLE AND LOCATION OF A DOCUMENT IN AN OVER-SCANNED IMAGE

(75) Inventors: Peter Rudak, Hilton, NY (US); Yongchun Lee, Rochester, NY (US); Thomas J. Morgan, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 569 days.

(21) Appl. No.: 10/262,049

(22) Filed: Oct. 1, 2002

(65) Prior Publication Data

US 2004/0062455 A1    Apr. 1, 2004

(51) Int. Cl.
*G06K 9/36* (2006.01)

(52) U.S. Cl. .......................... 382/289; 382/296

(58) Field of Classification Search ................ 382/282, 382/289, 290, 291, 296, 199, 203; 345/649, 345/652, 654, 657
See application file for complete search history.

(56) References Cited

U.S. PATENT DOCUMENTS

| | | | |
|---|---|---|---|
| 5,452,374 | A | 9/1995 | Cullen et al. |
| 5,818,976 | A | 10/1998 | Pasco et al. |
| 5,974,199 | A | 10/1999 | Lee et al. |
| 6,433,896 | B1 | 8/2002 | Ueda et al. |

FOREIGN PATENT DOCUMENTS

| | | |
|---|---|---|
| DE | 198 58 968 A1 | 7/1999 |
| EP | 1 184 808 A2 | 3/2002 |

OTHER PUBLICATIONS

Nakano, Y, et al, "Algorithm for the Skew Normalization of Document image", Pattern Recognition, 1990, Proceedings, 10th International Conference on vol. II, Jun. 16-21, 1990, pp. 8-13, vol. 2.*

Safabakhsh, R, et al, "Document Skew Detection using Minimum-Area Bounding Rectangle", Information Technology: Coding and Computing, 2000, Proceedings on Mar. 27-29, 2000, pp. 253-258.*

* cited by examiner

*Primary Examiner*—Yon J. Couso
(74) *Attorney, Agent, or Firm*—Nelson Adrian Blish

(57) ABSTRACT

A method for determining skew angle (5) and location of a document in an over-scanned digital image is disclosed. A document is scanned to capture a gray scale image. The outline pixel (1) of a document from the captured gray scale image are connected (2). An initial angle is set at zero and a x-minimum, y-minimum, x-maximum, and y-maximum of the polygon are determined (3). A rectangular boundary (4) area based on the x-minimum, y-minimum, x-maximum, and y-maximum is calculated and recorded. The angle is recorded and the polygon is rotated z-degree. The process is repeated and a minimum boundary area is selected. An angle corresponding to the minimum boundary is the skew angle of the document.

11 Claims, 5 Drawing Sheets

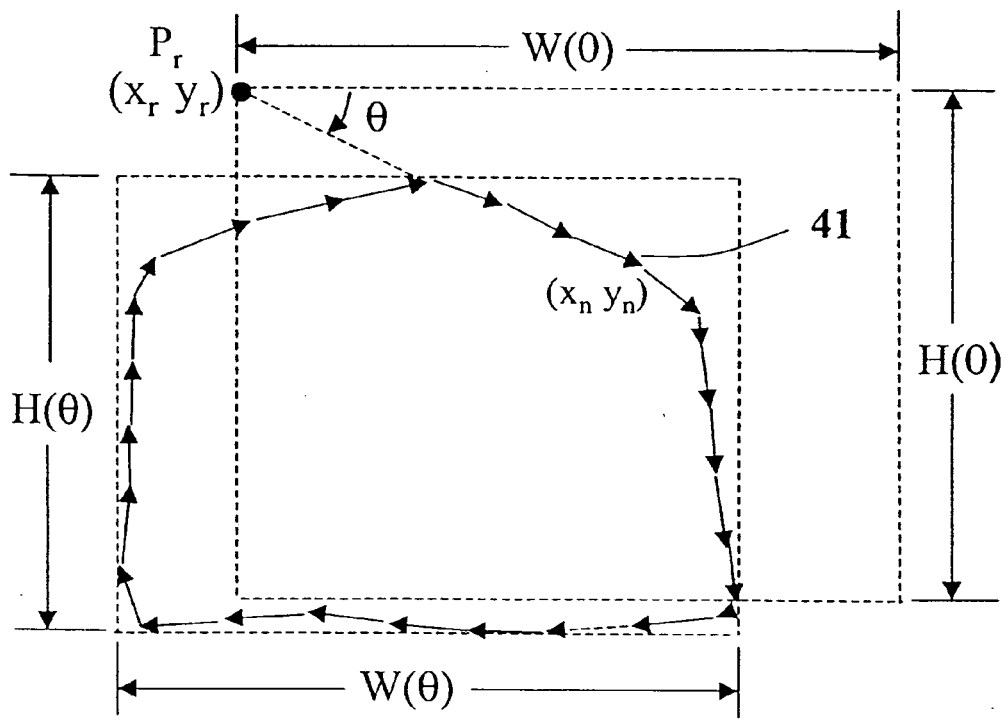
FIG. 6
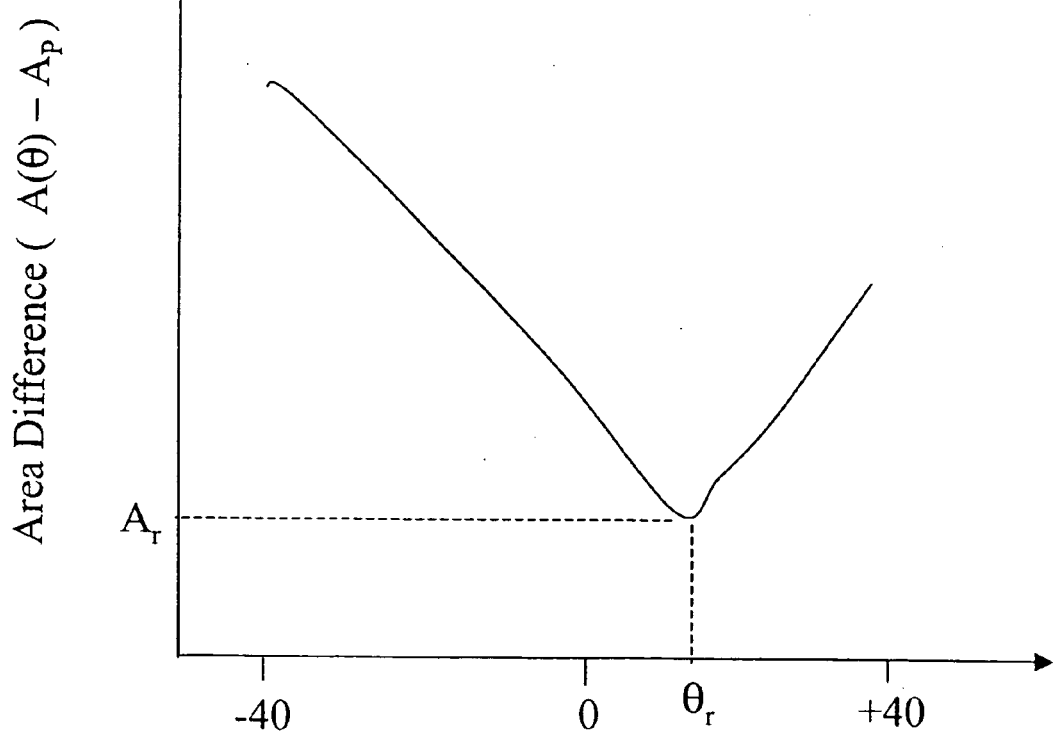
Rotation Angle (θ)   FIG. 7

METHOD FOR DETERMINING SKEW ANGLE AND LOCATION OF A DOCUMENT IN AN OVER-SCANNED IMAGE

FIELD OF THE INVENTION

The present invention relates in general to scanning and in particular to determining a skew angle and location of a document in an over-scanned image.

BACKGROUND OF THE INVENTION

When a paper document or a photograph is scanned by a scanning device such as flatbed type or rotary (production) type, the sensor scan width is often set to a wider range relative to the document to order to contain different size of documents. This results in an unwanted border, either in black or in white, surrounding the original document in the digital image. In addition, the resulting digital image is often skewed, either due to the mechanical imperfection of paper transportation in a production scanner or the improper placement of a print in a flatbed scanner or scanner input feeder. To reproduce a digital version which is identical to the appearance and size of the original document requires skew angle and location detection of the document in the digital image.

Various methods related to the skew angle and location of a digital image were published in U.S. Pat. Nos. 5,818,976; 5,452,374; and 5,974,199. These methods in the prior art detect a skew angle based on the slope of the detected document borders inside a digital image. In most cases the slope of the top border in the detected document is taken as the skew angle of the document so that the completed document can be reconstructed and located.

The success of the prior art in detecting document skew and in locating a document requires a clean straight border of a document. Any jaggedness on a border, or incomplete border, or partially torn border of a document, or irregular shape of a document, often results in the failure of skew and location detection. This dependence on a clean border for detecting skew and location of a document greatly reduces the robustness of these methods for use in heavy duty scanning environment. There is a need for a method of detecting skew angle and location of a document independent of the roughness of document borders and the irregularity of a document shape.

SUMMARY OF THE INVENTION

Briefly, according to one aspect of the present invention a method for determining skew angle and location of a document in an over-scanned digital image comprises the steps of:
a) scanning a document;
b) capturing a gray scale image;
c) detecting outline pixels of a document from the captured gray scale image;
d) connecting the detected pixels in a sequential order to form an outline polygon;
e) setting angle $\theta=0$
f) determining a x-minimum, y-minimum, x-maximum, and y-maximum of the polygon;
g) calculating a rectangular boundary area based on the x-minimum, y-minimum, x-maximum, and y-maximum;
h) recording the boundary area and $\theta$;
i) rotating the polygon z-degrees;
j) resetting $\theta=\theta+z$-degrees
k) repeating step f-j n-times;
l) selecting a minimum boundary area from the boundary areas recorded in step h);
m) recording a corresponding angle at the minimum boundary area; and
n) assigning the rotation angle having the minimum bounding area as the skew angle of the document.

The invention and its objects and advantages will become more apparent in the detailed description of the preferred embodiment presented below.

BRIEF DESCRIPTION OF THE DRAWINGS

FIG. 6 displays the dependence of the width and height of a bounding box on the rotation angle ($\theta$) of a polygon.

FIG. 7 displays the graphical relationship between the bounding area of a polygon and the rotation angle.

DETAILED DESCRIPTION OF THE INVENTION

Figure 1:
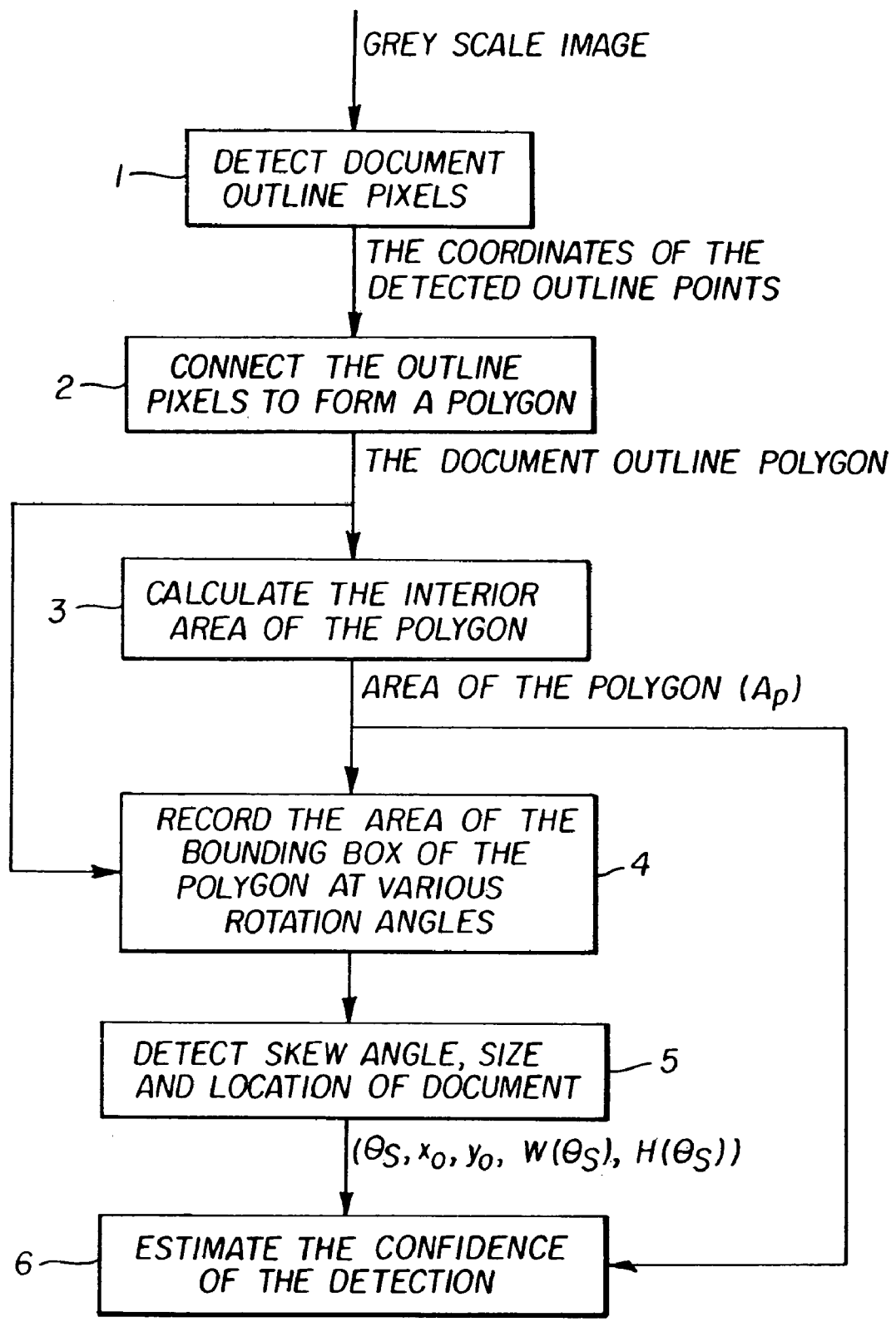
FIG. 1 is a block diagram of an image processing system for detecting skew angle and location of a captured document.
Figure 2:
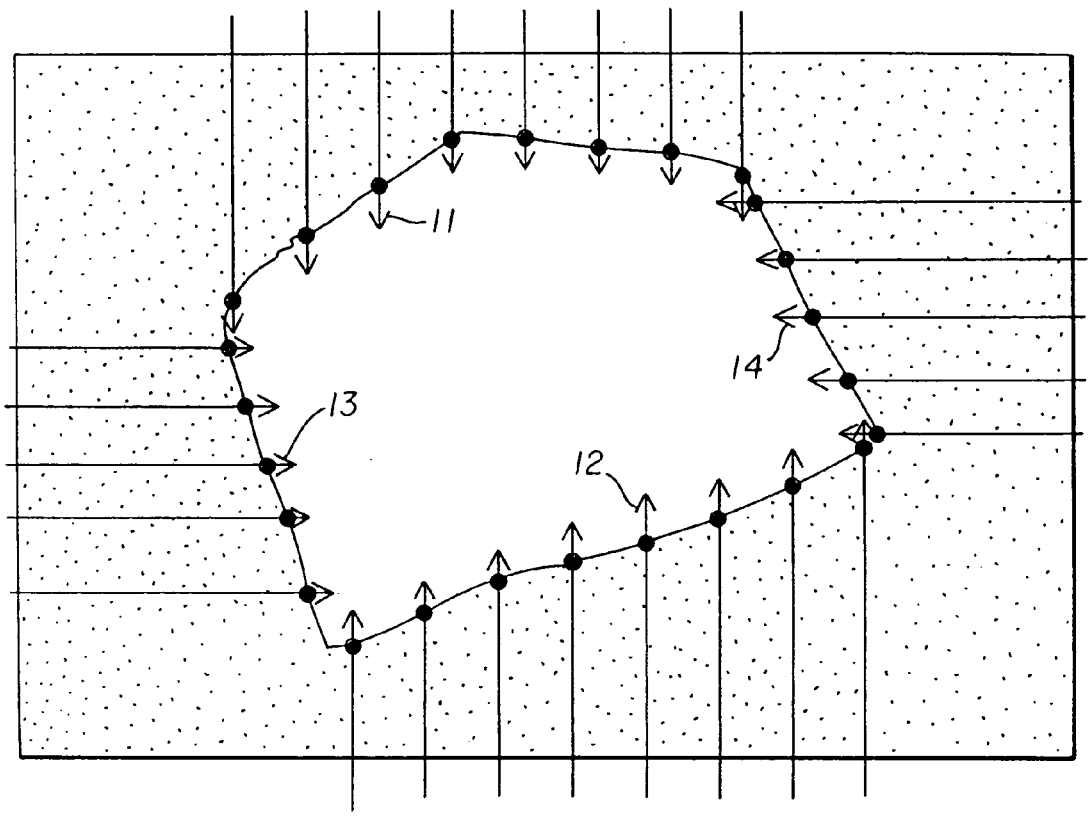
FIG. 2 is a graphical illustration of detecting the outline pixels of a document.
Figure 3:
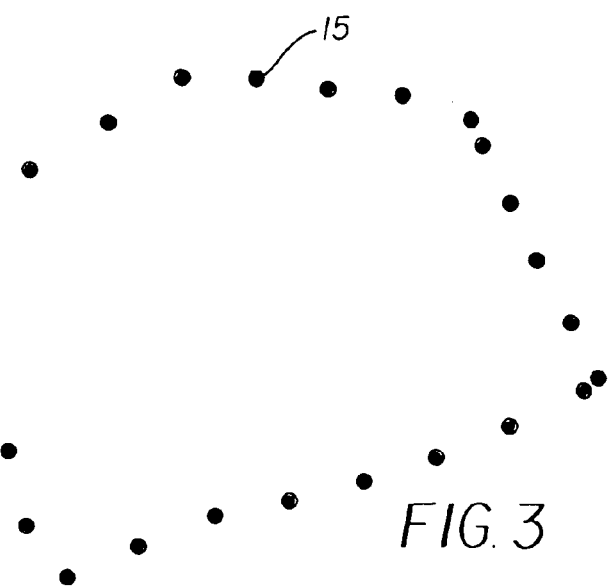
FIG. 3 shows the locations of the detected outline points of a document.
Figure 4:
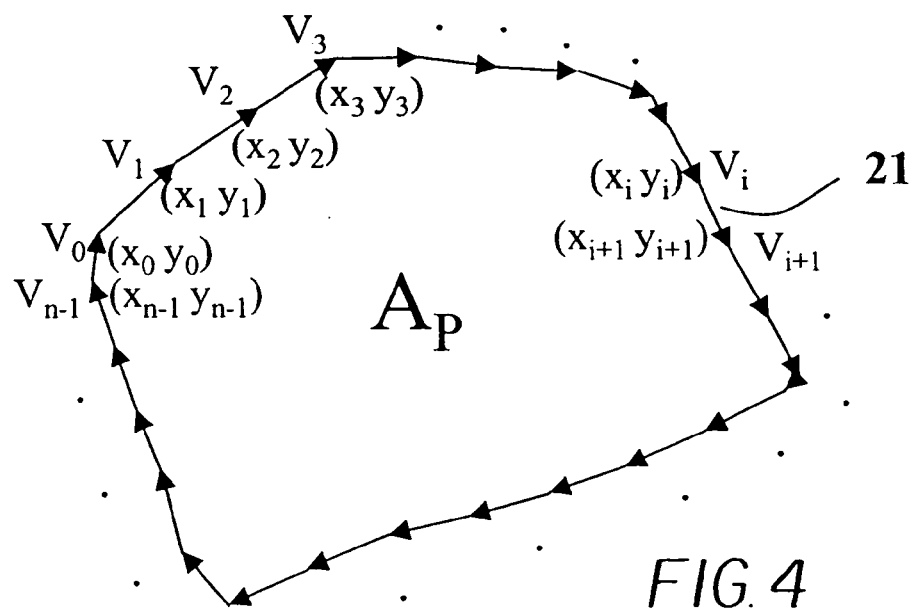
FIG. 4 is the polygon of a document outline constructed from the detected points in FIG. 3.

The steps of the detection method are shown in detail in FIG. 1. Referring to FIGS. 1 and 2, the document outline points 1 are detected based on the first black-to-white transition from four directions, top-to-bottom 11, bottom-to-top 12, left-to-right 13, right-to-left 14, as shown in FIG. 2. A noise filter may be applied to bypass the speckle noises in a noisy border. The spatial locations of the detected outline points 15 as shown in FIG. 3 are collected and saved as data. The data points are connected 2 and organized in sequential order according to their spatial locations along the document outline. Every pair of adjacent data points $v_I$ and $v_{I+1}$ forms a vector 21. The sequence of vectors as show in FIG. 4 forms a polygon. The vertices of the polygon are labeled by $(v_0, v_1, v_2, v_3, \ldots v_i, v_{i+1}, \ldots v_{n-1})$ and their respective coordinates are denoted by $((x_0\ y_0), (x_1\ y_1), (x_2\ y_2), (x_3\ y_3), \ldots (x_i\ y_i), (x_{i+1}\ y_{i+1}), \ldots (x_{n-1}\ y_{n-1}))$. The interior area ($A_p$) of the polygon is calculated 3 from the sum of cross products of polygonal vectors according to the following formula:

$$A_P = \frac{1}{2}\left|\sum_{i=1}^{n-1}(V_0V_i \times V_0V_{i+1})\right|$$

$$= \frac{1}{2}\left|\sum_{i=1}^{n-1}[(x_i - x_0)(y_{i+1} - y_0) - (x_{i+1} - x_0)(y_i - y_0)]\right|$$

Where the $V_0V_i$ and $V_0V_{i+1}$ are the two vectors connecting the vertex "0" and both vertices "i" and "i+1", respectively. The "X" symbol is the cross product of the two vectors.

Figure 5:
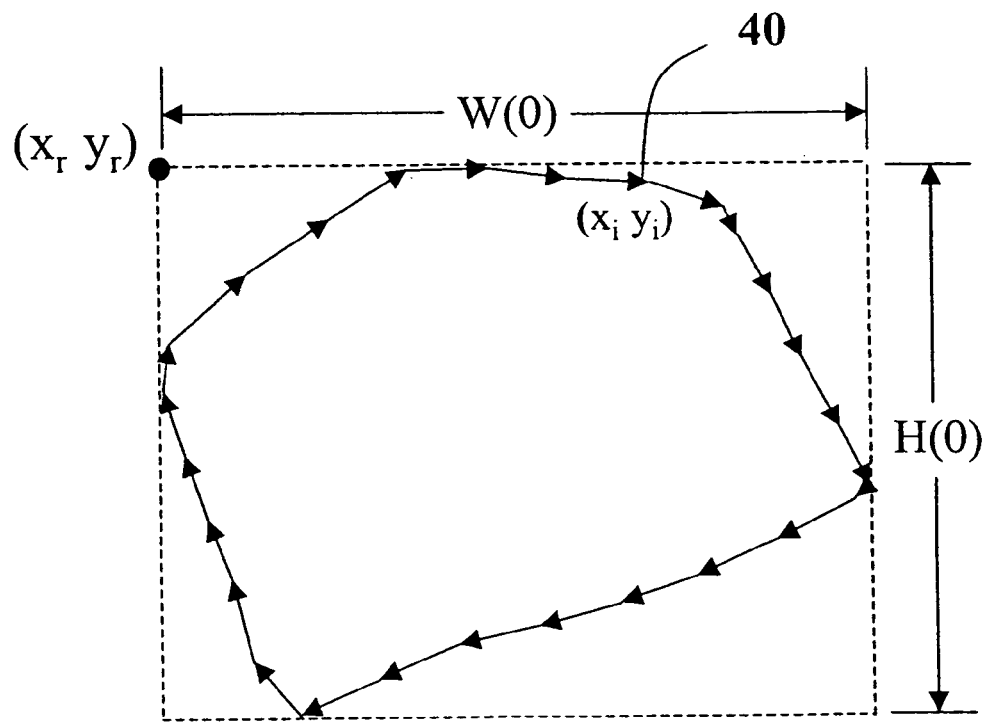
FIG. 5 shows the width and height of the bounding box of a polygon calculated from the coordinates of the vertices of the polygon in FIG. 4.

The width, W(0), of the polygon is the difference of the x-coordinates between the left-most vertex and the right-most vertex, and the height, H(0), of the polygon is the difference of y-coordinates between the top-most vertex and the bottom-most vertex. The upper left corner of the bounding box at the coordinate of $(x_r, y_r)$ as shown in FIG. 5 is selected as the point $(P_r)$ of origin, for rotation of the polygon. For every new angle ($\theta$), after the polygon is rotated with respect to the origin $(P_r)$, there is a corresponding width (W($\theta$)) and height (H($\theta$)) calculated as shown in FIG. 6. The corresponding bounding area (A($\theta$)) 4 is obtained by multiplying W($\theta$) with H($\theta$). The new coordinates of the vertices $(x_n, y_n)$ 41 of the polygon after rotation are based on the equation as following:

$$x_n = x_i * \cos(\theta) + y_i * \sin(\theta) - x_r$$

$$y_n = -x_i * \sin(\theta) + y_i * \cos(\theta) - y_r$$

Where the $(x_n, y_n)$ are the new coordinates of a vertex $(x_i, y_i)$ 40 after rotation by ($\theta$) degree with respect to the rotating point $(x_r, y_r)$.

Figure 8:
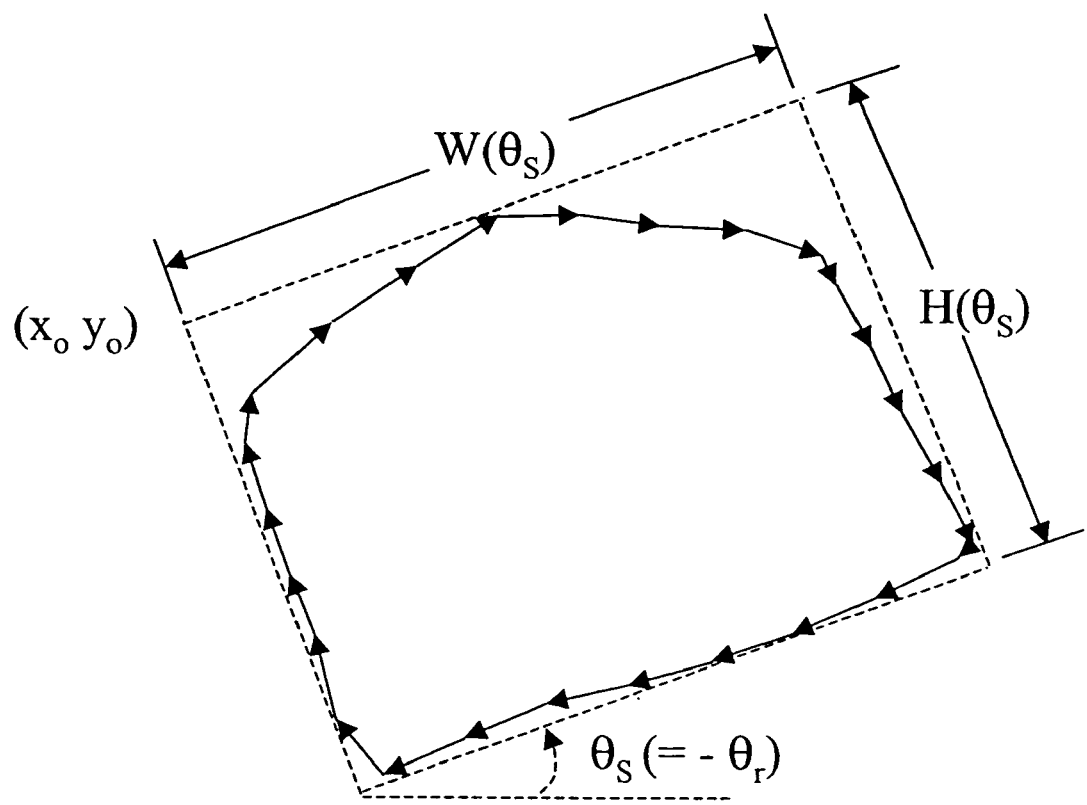
FIG. 8 graphically shows the final result of the skew angle and location detection of a document

FIG. 7 plots the relation of rotation angle ($\theta$) and the corresponding area difference of the bounding box (A($\theta$)) and the interior area ($A_p$) of the polygon. The minimum area difference ($A_r$) at rotation angle ($\theta_r$) indicates that when the polygon rotates to the angle ($\theta_r$), the best fit is made between the bounding box and the outline of the polygon. In case of a perfect rectangular document which is originally skewed at minus $\theta_r$ angle (counterclockwise skew), when the rectangular polygon is rotated (clockwise rotation) to angle ($\theta_r$). The bounding box of the rectangular polygon will exactly match with the polygon itself in which the minimum area difference, $A_r$, is zero. It implies that the skew angle of a scanned document is identical to the rotation angle, $\theta_r$, except in different orientation, in where the minimum area difference ($A(\theta_r) - A_p$) occurs. Hence, the detected skew angle ($\theta_s$) 5 is equal to the negative rotation angle ($-\theta_r$). The location of the upper left corner of the skew document 5 as shown in FIG. 8 is calculated according to the following geometric transformation:

$$x_o = (x_r + x_i) \cos(\theta_s) - (y_r + y_i) \sin(\theta_s)$$

$$y_o = (x_r + x_i) \sin(\theta_s) + (y_r + y_i) \cos(\theta_s)$$

The width and height of the document are the width (W($\theta_r$)) and height (H($\theta_r$)) 5 of the polygon when it is rotated at the angle of the $\theta_r$ degree.

The ratio, $R = (A_p)/(W(\theta_r) * H(\theta_r))$, of the polygon interior area and its bounding area is taken as the measure of the detection confidence 6. When the R value is closer to one, it indicates the document is more like the shape of a typical document (rectangular). The lower R value indicates the more irregular shape of a document.

The invention has been described in detail with particular reference to certain preferred embodiments thereof, but it will be understood that variations and modifications can be effected within the scope of the invention.

PARTS LIST

1 Document outline points
2 Data points connected
3 Interior area of polygon calculated
4 Corresponding bounding area
5 Detected skew angle
6 Detection confidence
11 Top-to-bottom
12 Bottom-to-top
13 Left-to-right
14 Right-to-left
15 Detected outline points
21 Vector
40 Vertex
41 Vertex

What is claimed is:

1. A method for determining skew angle and location of a document in an over-scanned digital image comprising the steps of:
   a) scanning a document;
   b) capturing a gray scale image;
   c) detecting outline pixels of a document from said captured gray scale image;
   d) connecting said detected pixels in a sequential order to form an outline polygon;
   e) setting angle $\theta = 0$;
   f) determining a x-minimum, y-minimum, x-maximum, and y-maximum of said polygon;
   g) calculating a rectangular boundary area based on said x-minimum, y-minimum, x-maximum, and y-maximum;
   h) recording said boundary area and $\theta$;
   i) rotating said polygon z-degrees;
   j) resetting $\theta = \theta + z$-degrees;
   k) repeating step f-j n-times;
   l) selecting a minimum boundary area from said boundary areas recorded in step h);
   m) recording a corresponding angle at said minimum boundary area; and
   n) assigning said rotation angle having the minimum bounding area as said skew angle of said document.

2. A method as in claim 1 comprising the additional step of:
   o) subtract x-minimum, from x-maximum, at said skew angle to determine document width; and
   p) subtract y-minimum from said y-maximum, at said skew angle to determine document length.

3. A method as in claim 2 comprising the additional step of:
   q) performing a location transformation of an origin point of said minimum bounding area to locate the document.

4. A method as in claim 3 comprising the additional step of:
   r) calculating an area of said polygon;
   s) comparing send area of said polygon to said minimum boundary area; and
   t) if said area of said polygon is within k-units of said minimum boundary area, there is a high degree of confidence that said location is correct.

5. A method as in claim 1 wherein said scanning is accomplished by a CCD sensor.

6. A method as in claim 1 wherein z=½ degree.

7. A method as in claim 1 wherein a rotation point for said polygon is located outside of said polygon.

8. A method as in claim 1 wherein a rotation point of said polygon is on said polygon.

9. A method as in claim 1 wherein a rotation point for said polygon is located inside said polygon.

10. An image processing method for determining skew angle and location of a document in an over-scanned digital image comprising:

a) scanning a document;
b) capturing a digital image;
c) detecting outline pixels of a document from said captured digital image;
d) connecting detected pixels in a sequential order to form an outline polygon;
e) determine a x-minimum, y-minimum, x-maximum, and y-maximum of said polygon;
f) set n=1
g) calculating a n rectangular boundary area based on said x-minimum, y-minimum, x-maximum, and y-maximum;
h) rotating said polygon z-degrees;
i) determine a new x-minimum, y-minimum, x-maximum, and y-maximum of said polygon;
j) m=n+1
k) calculating a new rectangular boundary area based on said x-minimum, y-minimum, x-maximum, and y-maximum; and
l) if said m rotational boundary area is greater than said n rectangular boundary area go to step m); if m boundary area is less than said n boundary area, reset n=n+1 and go to step g); if said m boundary area is equal to said n boundary area go to step m); and
m) end program.

11. A method for determining skew angle and location of a document in an over-scanned digital image comprising the steps of:

a) scanning a document;
b) capturing a color digital image;
c) detecting outline pixels of a document from said captured color digital image;
d) connecting said detected pixels in a sequential order to form an outline polygon;
e) setting angle $\theta=0$;
f) determining a x-minimum, y-minimum, x-maximum, and y-maximum of said polygon;
g) calculating a rectangular boundary area based on said x-minimum, y-minimum, x-maximum, and y-maximum;
h) recording said boundary area and $\theta$;
i) rotating said polygon z-degrees;
j) resetting $\theta=\theta+$z-degrees;
k) repeating step f-j n-times;
l) selecting a minimum boundary area from said boundary areas recorded in step h);
m) recording a corresponding angle at said minimum boundary area; and
n) assigning said rotation angle having the minimum bounding area as said skew angle of said document.

* * * * *